United States Patent [19]

Smit et al.

[11] 4,102,986
[45] Jul. 25, 1978

[54] PROCESS FOR THE CONTINUOUS MANUFACTURE OF NITROUS OXIDE

[75] Inventors: Jakob Van Rouendal Smit; Panayiotis Hassiotis; Robert Armistead Hasty, all of Johannesburg, South Africa

[73] Assignee: South African Inventions Development Corporation, Pretoria, South Africa

[21] Appl. No.: 739,910

[22] Filed: Nov. 8, 1976

Related U.S. Application Data

[63] Continuation-in-part of Ser. No. 542,965, Jan. 22, 1975, abandoned.

[51] Int. Cl.² ............................................ C01B 21/22
[52] U.S. Cl. .................................... 423/402; 423/404
[58] Field of Search ............................... 423/402, 404

[56] References Cited

U.S. PATENT DOCUMENTS

| 3,411,883 | 11/1968 | Smit | 423/400 |
| 3,656,899 | 4/1972 | Baechle et al. | 423/405 |

FOREIGN PATENT DOCUMENTS

| 534,248 | 12/1956 | Canada | 423/402 |

OTHER PUBLICATIONS

Smit; "Chemistry and Industry", Dec. 5, 1964, pp. 2018–2020.

Primary Examiner—G. O. Peters
Attorney, Agent, or Firm—Omri M. Behr

[57] ABSTRACT

Nitrous oxide (laughing gas) is produced by continuous decomposition of ammonium and nitrate ions fed into an aqueous, strongly acid reaction liquor containing chloride ion as catalyst. $N_2O$ and water are continuously removed.

Preferred parameters are
hydrogen ion 3 – 7 M, preferably, 4 – 6M, say 5–5.7M; chloride ion 0.05 – 0.45 M, preferably 0.05–0.3M, say 0.1–0.2M; nitrate ion 4–16M, preferably 8.5 – 15M, say 12–14.5M; ammonium ion 1M or more, preferably 4.5 – 9M, say 7 – 9M. temperature: above 80° C, preferably 105°–120° C.

The temperature is so maintained that the reaction liquor boils at the reaction temperature, the excess water being continuously removed by fractional distillation. The $N_2O$ which is withdrawn overhead, is scrubbed with caustic alkali to remove chlorine contamination in the form of hypochlorite byproduct.

The process offers a high degree of safety, flexibility and ease of control and can be carried out with inexpensive technical grades of ammonium nitrate.

16 Claims, 1 Drawing Figure

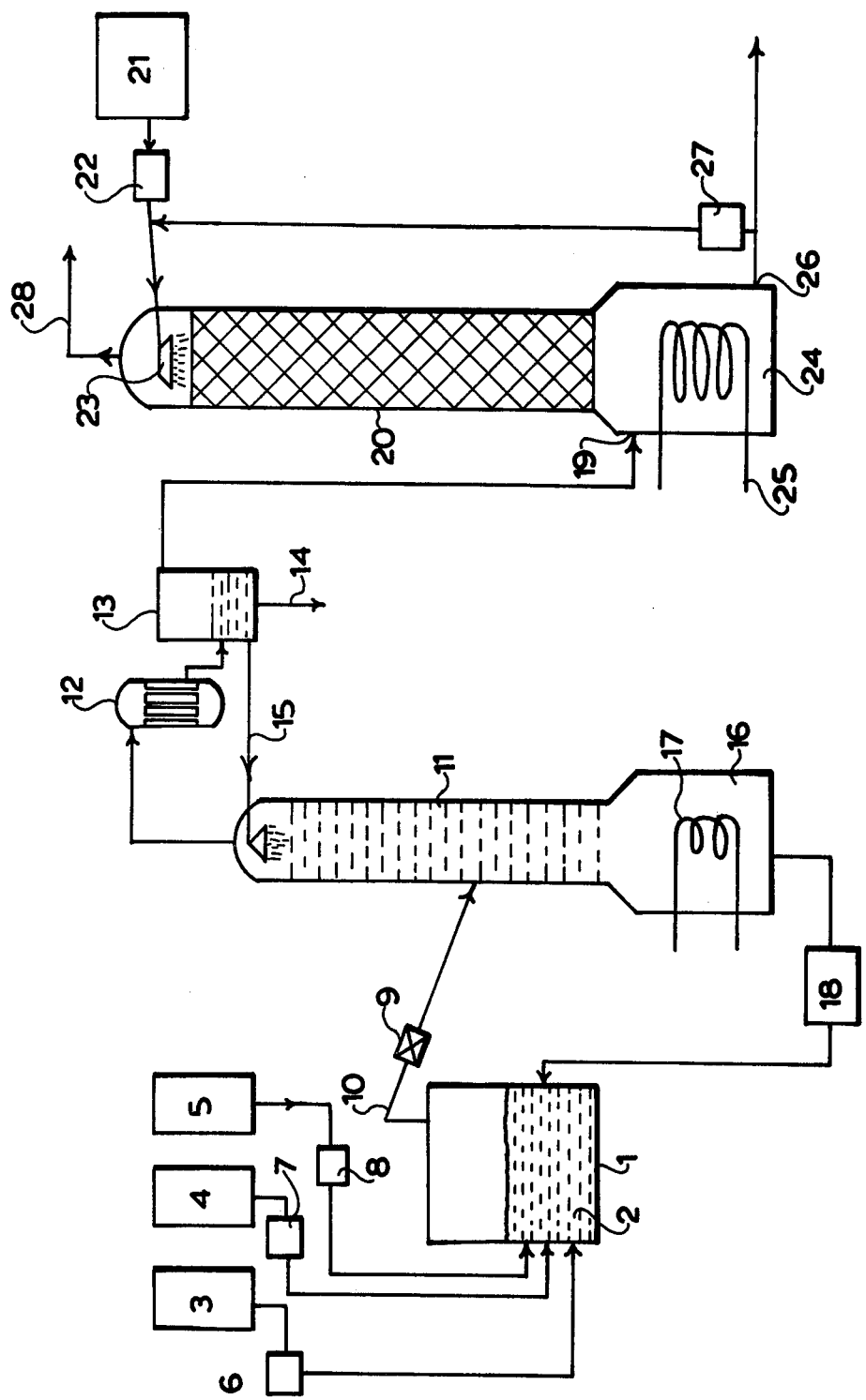

PROCESS FOR THE CONTINUOUS MANUFACTURE OF NITROUS OXIDE

RELATED APPLICATIONS

This application is a continuation-in-part of our co-pending application Ser. No. 542,965 filed Jan. 22, 1975, now abandoned.

BACKGROUND OF THE INVENTION

The present invention relates to a process for the manufacture of nitrous oxide by decomposition of ammonium and nitrate ions in an aqueous reaction liquor in a reaction space in which reaction liquor there is maintained a catalysing concentration of chloride ion and strongly acid conditions, nitrous oxide formed by decomposition of ammonium and nitrate ions being withdrawn from the reaction space.

A batch process in which this is achieved, e.g. in the context of removing ammonium nitrate quantitatively from fission product solutions, is described in U.S.A. Pat. No. 3,411,883. However, the process was not rendered continuous or optimalised to render it attractive as a competitor for the conventional process of manufacturing nitrous oxide.

Nitrous oxide, also known as laughing gas, is manufactured commercially by thermally decomposing a melt of pure ammonium nitrate at 250° to 260° C. In that manufacture it is essential that the ammonium nitrate is of special purity. In particular any chlorides must be absent because even at much lower temperatures it is found (even as low as 145° C) that the presence of traces of chloride ion in a melt of ammonium nitrate results in the formation of a gas containing as much as 70% nitrogen. Moreover, in the anhydrous melt the presence of chloride may give rise to explosions.

In the conventional process the nitrous oxide must be treated to remove impurities, in particular oxides of nitrogen normally by scrubbing with alkaline potassium permanganate solution. This is a wasteful purifying step which results in no useful by-products, and which is based on slow chemical reactions.

It is an object of the present invention to provide a continuous process for the manufacture of nitrous oxide wherein the nitrous oxide can readily be recovered in very pure form, which is very easily regulated and which is advantageous over the prior art in various respects.

In particular the new process can be carried out with industrial grade ammonium nitrate which has not been manufactured in a particularly pure form, a suitable grade being for example, that used in the manufacture of ammonium nitrate fertilizer. It is a comparatively low-temperature process, involving no explosive hazard under normal operating conditions, and for a given plant the throughput can be readily regulated within comparatively wide limits.

The conventional industrial process for the manufacture of nitrous oxide in addition employs a further scrubbing stage with dilute sulphuric acid for the removal of ammonium nitrate fumes and ammonia vapour. This particular scrubbing stage is also found unnecessary in the present process.

BRIEF DESCRIPTION OF THE INVENTION

In accordance with the present invention there is provided a process as defined in the opening paragraph, conducted as a continuous process comprising the following features:-
  (a) as said decomposition proceeds, feeding a source or sources of ammonium and nitrate ions into the aqueous reaction liquor contained in the reaction space;
  (b) Maintaining in the reaction liquor a temperature above 80° C up to and including the boiling temperature of the reaction liquor at the ambient pressure in the reaction space; and
  (c) withdrawing from the reaction space, as the decomposition proceeds, water formed by said decomposition and such excess water as may be introduced into the reaction space in the course of step (a) above.

The ammonium and nitrate ions may be introduced in the form of ammonium nitrate as such, either continuously or at intervals, preferably so selected that there is no undue fluctuation in the reaction conditions. Preferably the ammonium nitrate is of an industrial grade of the order of purity as used in the manufacture of ammonium nitrate fertilizer.

In principle it is also possible, however, to introduce separately ammonia and nitric acid in a ratio designed to maintain a suitable concentration of ammonium and nitrate ions.

Preferably the ammonium nitrate is fed into the reactor in the form of an aqueous solution. It is possible for such solution to be very concentrated, e.g. up to 88% by weight, provided the solution is kept very hot (higher than 100° C) to prevent crystallisation. However, it may be preferred to employ a less concentrated solution which will not crystallise at lower temperatures, e.g. a solution of between 50 and 65% by weight, preferably 60% by weight, which will not crystallise at normal ambient temperatures.

On the other hand, commercial fertilizer grade ammonium nitrate is usually available as a solution of concentration in the range 80 - 90% by weight, which may have to be maintained at a temperature as high as 120° C in order to prevent crystallisation. In appropriate cases this can result in reduced energy requirements of a plant employing concentrated feed solutions in that the amount of water which has to be removed as the process proceeds is reduced. On the other hand, the employment of more dilute solutions facilitates the maintainance of higher reflux ratios in the fractionation column for preventing the escape of hydrochloric and nitric acid vapours. The person skilled in the art can thus choose between various alternatives in order to optimalise the economics of the process and plant in a given set of circumstances.

Also, it may be necessary to replenish nitric acid from time to time or continuously in order to compensate for minor losses by evaporation.

Chloride ions will have to be replenished as well, e.g. in the form of hydrochloric acid, in order to compensate for losses.

In the preferred embodiments the withdrawing of water from the reaction space is carried out by said water being distilled off under reflux conditions.

In view of the ease with which the preferred embodiment of the process permits the removal of excess water from the system (whilst simultaneously substantially inhibiting the escape of volatile reagents), it may be preferred to introduce nitric acid and/or the source of chloride ions in the form of dilute solutions.

Preferably, substantially the only acid anions present in the solution are chloride and nitrate ions. In other words, we have now found that the presence of, for example, sulphuric acid is not advantageous and is preferably avoided, even though it is possible in principle to employ sulphuric acid as one of the acids in the system.

Preferably the process is carried out at the boiling temperature of the reaction liquor at the pressure prevailing in the reaction space. Generally speaking, although the process has been carried out successfully at temperatures as low as 94° C (in fact the decomposition of ammonium nitrate starts at 80° C), it is more advantageously carried out in the range of between 105° and 135° C, preferably 105° to 120° C. For that purpose the pressure in the reaction space may be increased above the pressure in the surrounding atmosphere.

For example, certain preferred embodiments are conducted at a pressure at least 0.1 atmospheres gauge above ambient pressure, more preferably between 0.2 and 3 atmospheres gauge, say between 0.5 and 2 atmospheres gauge.

The effect of increasing the pressure is to increase the boiling temperature of the reaction liquor, and, if the process is carried out at the boiling point, it means increasing the reaction rates. Accordingly, the production capacity of a given size of plant is increased to an extent which is normally more significant than the loss in specificity of the decomposition reaction. Raising the pressure by 0.5 atmospheres, corresponds to a temperature rise of about 5° C and an increase of the reaction rate by a factor of about 2. Whereas at say 105° C the specificity may be such that the nitrous oxide evolved is contaminated with only between 1 and 3% chlorine and nitrogen gas together, this contamination may now increase to say 3 to 5%. In many instances this may be a small price to pay for the increase in production capacity, particularly bearing in mind the fact that the chlorine may be converted into useful by-products.

On the other hand (as described in more detail further below), the reaction rate may also be increased by increasing the concentrations of some of the reagents in the reaction liquor. This in turn may raise the boiling point of the reaction liquor so much that for the sake of improved specificity it may be desirable to lower the boiling temperature by maintaining a reduced pressure in the reaction space.

Whereas, in the conventional process undesirable oxides of nitrogen are formed which have to be removed by scrubbing, normally with alkaline permanganate, the presence of some chlorine in the gas stream of the present process ensures that even if NO and $NO_2$ were to be formed in the reactor, they would be removed very efficiently.

In the preferred process the chlorine is scrubbed out of the product gas with alkali, e.g. aqueous caustic soda or lithium hydroxide. In either case such scrubbing results in the formation of the respective alkali metal hypochlorite which can serve as a useful by-product.

In the preferred process the concentration of ammonium nitrate in the reaction space is maintained at a level between 1 molar and the solubility of the ammonium nitrate in the aqueous liquor at the reaction temperature. The ammonium nitrate concentration in the reaction liquor is preferably not less than 2 molar, more preferably not less than 3 molar. The molar concentration of nitrate ions is preferably substantially higher than that of the ammonium ions.

The total nitrate ion concentration in the liquor is preferably not less than 4 molar.

As regards acidity, the total hydrogen ion concentration is preferably kept at not less than 3 molar, and also preferably at not more than 7 molar, more preferably 6 molar.

The total acidity is preferably due entirely to nitric and hydrochloric acids.

The chloride ion concentration is preferably not less than 0.05 molar, more preferably not less than 0.1 molar. If the chloride ion concentration is raised too much, an increased evolution of nitrogen and chlorine may result. Therefore the chloride ion concentration is preferably not more than 1 molar.

Preferably at least 10% by weight of water is maintained in the reaction liquor, more preferably not less than 15%, more particularly not less than 25%. The preferred upper limit may be calculated by assuming the above specified minimum concentrations of the various remaining reagents. This preferred upper limit is 90% by weight of water, preferably 80%.

The process has self-regulating features. If the ammonium nitrate feed rate is increased, either accidentally or by design, all other parameters remaining constant, the reaction rate will increase until a new level is reached at which ammonium nitrate is consumed in the reaction as fast as it is introduced. Nitrogen gas may be eliminated from the product gas after liquefaction of the nitrous oxide which latter may be done in accordance with current practice.

A typical specification (USA) for ammonium nitrate used in the conventional nitrous oxide process is:
ammonium nitrate (dry base, 99,95% minimum) chloride 0.0002% maximum ether extractable matter (organics) 0,01% maximum acidity (as $HNO_3$) 0,025% maximum. moisture content less than 0,3%.

This material is currently about 55% more expensive than fertilizer grade ammonium nitrate (available as an 88% solution), with a rising tendency.

It will be noted that three of the items which in the above conventional specification must be substantially absent from the starting material, are actually required as part of the reaction system in the process in accordance with the invention. These impurities, if present, are therefore an advantage and not a disadvantage as in the conventional process. In the conventional process the organic impurities must be absent, i.a. because of the explosion hazard associated with their presence. This latter consideration does not apply to the aqueous process in accordance with the invention.

In the conventional process, metallic impurities such as iron in the ammonium nitrate have a deleterious effect, promoting the formation of NO and $NO_2$. In the present process very much larger concentrations of these impurities normally present in industrial grade ammonium nitrate can be tolerated.

Whereas the reactor yields of the conventional process and a process in accordance with the invention are comparable, a major source of loss of ammonium nitrate in the conventional process, namely by sublimation, is impossible in the present process. In the conventional process the greater number of scrubbing stages involves additional sources of losses which are partly avoided in the present process.

The present invention permits the throughput capacity of a given plant to be adapted substantially to an existing market demand for nitrous oxide, increased throughput rates being possible at the expense of somewhat higher losses of starting materials in the form of nitrogen and chlorine. As stated previously, the chlorine can be converted into hypochlorites for which a ready market exists, whilst the decreased percentage yield based on ammonium nitrate introduced may to a large extent be offset or even more than offset by capital savings on additional plant, and price-rises resulting from an increased demand for the final product.

Also in accordance with the invention, there is provided an apparatus for the continuous manufacture of nitrous oxide by the aforesaid process which comprises a reaction vessel; means for feeding into the reaction vessel a source of ammonium ions, a source of nitrate ions, a source of chloride ions and of acid; a continuous fractionating column having a vapour inlet connected to an overhead outlet of the reactor vessel, the base of the fractionating column comprising heating means and means for returning bottoms liquor to the reactor vessel; condensing means for condensing aqueous vapours leaving the fractionating column overhead, condensate collecting means, including water withdrawal means, and a means adapted for the return of liquid phase to the top of the fractionating column to serve as reflux liquor; a gas scrubbing apparatus having a gas inlet for gas to be scrubbed, connected to an outlet of the condenser and condensate collecting means, adapted for the feeding of uncondensed gas containing nitrous oxide into the scrubber, means adapted for feeding scrubbing liquor to the scrubbing apparatus, the scrubbing liquor being an appropriate solution of alkali metal hydroxide, means for collecting and further processing the scrubbed gas, being a nitrous oxide gas freed of chlorine, and an outlet for spent scrubbing liquor.

In accordance with the preferred embodiment, means are also provided for recycling part of the partly spent scrubbing liquor to the scrubbing liquor inlet for reuse. Alternatively, or in addition, it is possible for more than one scrubbing apparatus to be connected in series, the spent scrubbing liquor of the second scrubber constituting the scrubber liquor feed of the first scrubbing apparatus.

Preferably the scrubbing apparatus takes the form of a conventional scrubbing column, the bottoms collecting vessel of which is preferably provided with cooling means.

Preferably the outlet for spent scrubbing liquor is connected to plant for recovering from the spent scrubbing liquor saleable alkali metal hypochlorite.

The gas outlet of the gas scrubbing apparatus preferably feeds into an apparatus adapted for drying and condensing the nitrous oxide and for separating such nitrous oxide from nitrogen gas.

The aforesaid fractionating column may be of substantially conventional design, either of the packed column type, or of the sieve plate or bubble cup type.

The number of theoretical plates required of the fractionating column for fractionating out hydrochloric acid and nitric acid effectively will depend on the selected reflux ratio and can be determined in conventional manner. Allowance must be made for the large volumes of uncondensable gas present in the vapour phase.

In a preferred embodiment the reactor vessel is designed to be operating at a higher than ambient pressure. The higher than ambient pressure may result partly or wholly from pressure drops across the fractionating column and/or the gas scrubbing apparatus. However, additional means may be provided to raise the pressure in the reactor vessel, such as a throttle valve e.g. at the outlet for the vapour phase produced in the reactor.

BRIEF DESCRIPTION OF THE DRAWING

In the following the invention will be further described by way of example, partly with reference to the accompanying drawing which represents in diagrammatic form a plant for carrying out the process in accordance with the invention.

DESCRIPTION OF PREFERRED EMBODIMENTS

As shown in the drawings, the plant in accordance with the invention illustrated comprises a reaction vessel 1 containing reaction liquor 2. The composition of the reaction liquor is regulated and/or maintained during th reaction by the introduction into the liquor of appropriate solutions of ammonium nitrate, hydrochloric acid and nitric acid from supply vessels 3, 4 and 5 respectively by means of metering pumps 6, 7 and 8 respectively. The reaction vessel 1 is heated by means of heating means which are not shown, preferably to the boiling temperature of the liquor. The pressure in the reaction vessel (and thus the boiling temperature of the liquor 2) can be regulated by means of an adjustable throttle 9 provided in the overhead outlet 10 of the reactor vessel.

The said overhead outlet continuously feeds vaporous reaction product from the reactor into the continuous fractionating column 11. The vapours leaving the fractionating column 11 overhead, are cooled in the heat exchanger 12 serving as condensing means from where condensed liquid and uncondensable gases pass into the condensate collecting means 13. From there, part of the condensate consisting mainly of water is withdrawn at 14 and discharged, whereas the remainder via 15 is returned to the top of the fractionating column as reflux liquor. The bottoms pot 16 of the fractionating column comprises heating means 17 in a conventional manner. The bottoms liquor of the column 11, consisting mainly of aqueous hydrochloric and nitric acids, is returned by recycling pump 18 to the reactor vessel 1.

The overhead uncondensed gases, consisting mainly of nitrous oxide and some chlorine and nitrogen, are withdrawn overhead from the condensate collecting means 13, and are fed at 19 into the bottom portion of a conventional gas scrubbing column 20. The scrubbing column 20 may be of any conventional packed column or other suitable design. It is supplied with scrubbing liquor (aqueous NaOH or lithium hydroxide) from a storage vessel 21 through a feed pump 22 and a spray device 23 in the top of the column 20. The spent or partly spent scrubbing liquor entering the bottom 24 of the scrubbing column, may be subjected to cooling by means of cooling coils 25 prior to withdrawal at 26. The withdrawn spent scrubbing liquor may then be stored, and if desired or required, further processed for sale as hypochlorite. Part of the spent scrubbing liquor may be recycled by means of a recycling pump 27 to the top of the column 20.

The scrubbing gas consisting now substantially only of nitrous oxide and nitrogen leaves the top of the scrubbing column at 28, and is then dried and compressed to cause condensation of the nitrous oxide and the separation of the nitrogen.

The apparatus may be modified by mounting the fractionating column 11 directly on top of the reactor so that the bottoms liquor flows directly back into the reactor vessel, the vapour being fed into the column at an appropriate level.

EXAMPLE

The reaction mixture in a reaction vessel 1 of a pilot plant of the above type had the following composition:-
  300 g (dry weight) of fertilizer grade ammonium nitrate.
  300 ml of concentrated nitric acid (50% by weight)
  300 ml of water and
  15 ml of concentrated hydrochloric acid (30% by weight).

Vessel 3 contained a 60% solution of ammonium nitrate, vessel 4 contained concentrated nitric acid and vessel 5 contained dilute hydrochloric acid (3M). The experiment was conducted at approximately 1500 m above sealevel (ambient pressure about 630 mm Hg). The pressure drop through the fractionating column and remaining parts of the apparatus caused a pressure rise in the reaction vessel of about 0,1 atmospheres gauge. The average gas evolution rate was 2,75 liters per minute per liter of reaction solution and the evolved gas was composed of nitrous oxide and contained between 1 and 2% each of chlorine and nitrogen. Once steady conditions had been achieved, the temperature in the reaction vessel was between 106.7 and 108.0° C.

Extensive experiments were conducted with the aforesaid system, changing only one parameter at a time, to determine and arrive at the optimum parameters as explained in part more fully in the general description preceding the example.

More particularly the preferred composition of the aqueous reaction liquor is maintained within the following limits:
  Hydrogen ions between 4 and 7 M
  Nitrate ions between 7 and 16 M
  Ammonium ion between 1M and the maximum solubility of ammonium ions in the presence of aqueous nitrate at the reaction temperature
  Chloride ion between 0.05 and 0.45 M.

More preferably the hydrogen ion concentration is between 4 and 6 M, the nitrate ion concentration is between 8, more preferably 8.5 and 15 M, the ammonium ion concentration is at least 3 M, preferably between 4.5 and 9 M and the chloride ion concentration is between 0.05 and 0.3 M.

In particular the hydrogen ion concentration is maintained between 5 and 5.5 M, the ammonium ion concentration is maintained between 7 and 9 M, the chloride ion concentration is maintained between 0.1 and 0.2 M and the nitrate ion concentration between 12 and 14.5 M and the reaction temperature is maintained between 105 and 120° C.

Thus it was found that selectivity in respect of $N_2O$ improves as the concentration of hydrogen is increased up to about 5 – 5.5 M and nitrate ion to 12 to 14.5 M with a simultaneous increase in the reaction rate. Raising the concentration of nitric acid further will further increase the reaction rate, but at the cost of selectivity.

High ammonium nitrate concentrations result in high reaction rates and simultaneous favourable effects on selectivity.

At the preferred high concentrations of nitric acid and ammonium nitrate, the aforesaid low concentrations (below 0.2 M) of chloride ion achieve a good catalytic, effect combined with good selectivity. These preferred low concentrations in respect of hydrochloric acid are lower than the concentrations described in USA Pat. No. 3 411 833.

What is claimed is:

1. In a process for the manufacture of nitrous oxide comprising the decomposition of ammonium and nitrate ions in the presence of chloride ion and high hydrogen ion concentration in an aqueous reaction liquor in a reaction space in a continuous process.

the improvement comprising process conditions:
   (a) the concentration of chloride ions being maintained between 0.05 and 0.45 M, the concentration of hydrogen ions being maintained between 3 M and 7 M; the concentration of ammonium ions being maintained between 1 M and the maximum solubility of ammonium ions in the presence of nitrate ions at the reaction temperature and the concentration of nitrate ions being maintained between 4M and 16M;
   (b) as said decomposition proceeds, feeding ammonium and nitrate ions and hydrogen and chloride ions into the aqueous reaction liquor contained in the reaction space,
   (c) maintaining in the reaction liquor a temperature above 80° C, said temperature being the boiling temperature of the reaction liquor at the ambient pressure inside the reaction space;
   (d) withdrawing from the reaction space, as the decomposition proceeds, water formed by said decomposition and such excess water as may be introduced into the reaction space in the course of step (b) above by distilling such water together with the nitrous oxide in the form of an acidic aqueous vapour containing free nitric acid and hydrochloric acid from the reaction space into a fractionation space;
   (e) producing an overhead condensate consisting essential of water over said fractionation space;
   (f) removing and discarding part of said water condensate
   (g) returning another part of said water condensate to the fractionation space, said condensate washing downwardly the upwardly flowing nitric and hydrochloric acid vapours of step (d);
   (h) recovering said hydrochloric and nitric acids as free acids in aqueous solution as bottoms liquor and recycling the bottomsliquor to the reaction space; and
   (i) removing overhead from said fractionation space the nitrous oxide in a form essentially depleted of nitric acid and hydrochloric acid.

2. Process according to claim 1, wherein step (a) comprises introducing ammonium ion and nitrate ion as ammonium nitrate.

3. Process according to claim 2, wherein the ammonium nitrate is of an industrial grade containing impurity levels acceptable in the manufacture of ammonium nitrate fertilizer but unacceptable in the manufacture of nitrous oxide by the conventional thermal decomposition of a melt of ammonium nitrate.

4. Process according to claim 1, wherein said boiling temperature is between 105° and 135° C.

5. Process according to claim 4, wherein said boiling temperature is between 105° and 120° C.

6. Process according to claim 1, wherein the minimum concentration of ammonium ion is 3 M.

7. Process according to claim 1, wherein said chlorine ion concentration is between 0.05 and 0.2 moles per liter.

8. Process according to claim 1, wherein the aqueous reaction liquor a content of between 10 and 90% by weight of water is maintained.

9. Process according to claim 8, wherein in said reaction liquor a content of between 15 and 80% by weight of water is maintained.

10. Process according to claim 8, wherein in said reaction liquor a content of at least 25% by weight of water is maintained.

11. Process according to claim 1, wherein hydrochloric and nitric acids are essentially the only acids present in the reaction liquor.

12. Process according to claim 1, wherein step (i) comprises scrubbing the nitrous oxide gas with aqueous alkali in order to remove chlorine in the form of a hypochlorite.

13. Process according to claim 12, wherein the hypochlorite is recovered as a product.

14. Process according to claim 1, wherein the composition of the aqueous reaction liquor is maintained within the following limits:
hydrogen ions between 4 and 7M
ammonium ions between 3 and 9 M
nitrate ions between 7.0 and 16.0 M
chloride ions between 0.05 and 0.45 M.

15. Process according to claim 14, wherein the hydrogen ion concentration is between 4 and 6M, the ammonium ion concentration is between 4.5 and 9M and the chloride ion concentration is between 0.05 and 0.3 M, and the nitrate ion concentration is between 8.5 and 15 M.

16. Process according to claim 15 wherein the ammonium ion concentration is maintained between 7 and 9 M, the hydrogen ion concentration is maintained between 5 and 5.7 M, the nitrate ion concentration is maintained between 12 and 14.5 M, the chloride ion concentration is maintained between 0.1 and 0.2 M and the reaction temperature is maintained between 105 and 120° C.

* * * * *